United States Patent
Lin

(10) Patent No.: US 9,275,431 B2
(45) Date of Patent: Mar. 1, 2016

(54) METHOD AND SYSTEM FOR CALIBRATING LASER MEASURING APPARATUS

(71) Applicant: National Taiwan University of Science and Technology, Taipei (TW)

(72) Inventor: Tzung-Han Lin, New Taipei (TW)

(73) Assignee: National Taiwan University of Science and Technology, Taipei (TW)

(*) Notice: Subject to any disclaimer, the term of this patent is extended or adjusted under 35 U.S.C. 154(b) by 0 days.

(21) Appl. No.: 14/451,451

(22) Filed: Aug. 5, 2014

(65) Prior Publication Data
US 2015/0178910 A1 Jun. 25, 2015

(30) Foreign Application Priority Data
Dec. 24, 2013 (TW) .............................. 102148014 A

(51) Int. Cl.
*G06K 9/00* (2006.01)
*G06T 3/00* (2006.01)
*G01B 11/25* (2006.01)
*G06T 7/00* (2006.01)

(52) U.S. Cl.
CPC .......... *G06T 3/0006* (2013.01); *G01B 11/2504* (2013.01); *G06T 3/00* (2013.01); *G06T 7/0018* (2013.01); *G06T 7/0057* (2013.01); *G06T 2207/30204* (2013.01)

(58) Field of Classification Search
None
See application file for complete search history.

(56) References Cited

U.S. PATENT DOCUMENTS

| 5,083,073 | A * | 1/1992 | Kato | .............................. 318/577 |
| 5,506,683 | A * | 4/1996 | Yang et al. | ..................... 356/606 |
| 7,013,040 | B2 | 3/2006 | Shiratani | |
| 8,355,601 | B2 | 1/2013 | Ding et al. | |
| 2005/0046873 | A1 * | 3/2005 | Suzuki | .......................... 356/605 |
| 2005/0162420 | A1 * | 7/2005 | Ban et al. | ....................... 345/419 |
| 2006/0003096 | A1 * | 1/2006 | Hartmann et al. | ........... 427/207.1 |
| 2008/0144035 | A1 * | 6/2008 | Allred et al. | .................. 356/446 |

(Continued)

FOREIGN PATENT DOCUMENTS

| CN | 1482443 | 3/2004 |
| CN | 103177442 | 6/2013 |

(Continued)

OTHER PUBLICATIONS

Jong-Fun Ha, et al., "Calibration of structured light stripe system using place with slits," Optical Engineering, vol. 52, No. 1, Jan. 2013, pp. 013602-1-pp. 013602-4.

(Continued)

*Primary Examiner* — Wesley Tucker
(74) *Attorney, Agent, or Firm* — Jianq Chyun IP Office

(57) ABSTRACT

A method for calibrating a laser measuring apparatus having a laser illumination unit and an image capturing unit includes the following steps. A calibration board having at least one slit gap and a plurality of markers is provided. The relative position between the calibration board and the laser illumination unit is adjusted to allow a slit laser beam emitted by the laser illumination unit to pass through the at least one slit. The calibration board is captured by the image capturing unit to generate a calibration board image. The calibration board image is processed so as to obtain a camera coordinate of each of the markers. A plurality of calibration parameters are calculated according to the camera coordinate and an actual coordinate of each of the markers so as to obtain actual coordinates of an object captured in an object image generated by the laser measuring apparatus.

10 Claims, 5 Drawing Sheets

(56) References Cited

U.S. PATENT DOCUMENTS

2012/0133780 A1     5/2012     Zhang et al.
2013/0208098 A1     8/2013     Pujol Alcolado et al.

FOREIGN PATENT DOCUMENTS

| TW | 397210 | 7/2000 |
| TW | 488145 | 5/2002 |
| TW | 561241 | 11/2003 |
| TW | I238885 | 9/2005 |

OTHER PUBLICATIONS

"Office Action of Taiwan Counterpart Application," issued on Jan. 5, 2015, p. 1-p. 4, in which the listed references were cited.

Vilaca et al., "Non-contact 3D acquisition system based on stereo vision and laser triangulation," Machine Vision and Applications, Jul. 2010, pp. 341-350.

Kumar et al, "Direct recovery of shape from multiple views: a parallax based approach," Proceedings of the 12th IAPR International Pattern Recognition, Oct. 9-13, 1994, pp. 685-688.

Curless et al., "A Volumetric Method for Building Complex Models from Range Images," Proceedings of the 23rd annual conference on Computer graphics and interactive techniques, Aug. 4-9, 1996, pp. 303-312.

Wang et al., "A Method on Modeling and Visualization of 3D Object," The International Archives of the Photogrammetry, Remote Sensing and Spatial Information Sciences, 2003.

Hsin-Cyuan Chen, "Abstract of Error Analysis of Non-contact Three-dimensional Object Scanning using Smartphone and Line Laser," Thesis of Master Degree, National Kaohsiung University of Applied Sciences Institutional Repository, Jan. 2014, pp. 1.

Makerbot Industries, LLC, "Makerbot Digitizer 3D Scanner," http://store.makerbot.com/digitizer, retrieved on Jul. 2014.

Nextengine, "NextEngine 3D Scanner HD," www.nextengine.com/productsscannerspecs, retrieved on Jul. 2014.

Matter and Form, Inc., "Matter and form 3D Scanner," www.matterform.netscanner, retrieved on Jul. 2014.

* cited by examiner

METHOD AND SYSTEM FOR CALIBRATING LASER MEASURING APPARATUS

CROSS-REFERENCE TO RELATED APPLICATION

This application claims the priority benefit of Taiwan application serial no. 102148014, filed on Dec. 24, 2013. The entirety of the above-mentioned patent application is hereby incorporated by reference herein and made a part of this specification.

BACKGROUND OF THE INVENTION

1. Field of the Invention

The present invention generally relates to a method and system for calibration, in particular, to a method and system for calibrating laser measuring components.

2. Description of Related Art

In the field of computer graphics, three-dimensional (3D) model construction has been extensively applied in aspects such as industrial design, reverse engineering, medical image processing, criminal identification, digital documentation of culture artifacts, archaeological artifacts Geometric measurement techniques in measuring the contour shape of an object are mainly classified into contact measurement and non-contact measurement.

The contact measurement technique is frequently applied in industrial engineering thanks to its precision. However, such method involves point-by-point scanning through an object surface, which may be inefficient and may potentially destroy the object. Therefore such method is not suitable for reconstructing culture artifacts or archaeological artifacts. On the other hand, the non-contact measurement technique involves emitting energy onto an object and detecting its reflection in order to calculate the 3D data of the object.

One of the most commonly adopted non-contact measurement methods is triangulation. In a triangulation based measurement approach, a laser measuring apparatus projects a laser light beam onto the surface of an object, and a camera is exploited to look for the location of a laser dot on the object, where the laser dot, the camera, and the laser measuring apparatus form a triangle. As the distance between the laser measuring apparatus and the object changes, since the distance between the laser measuring apparatus and the camera as well as the angle of the laser light beam emitted by the laser measuring apparatus are known, the distance between the object and the laser measuring apparatus may be calculated based on the location of the laser dot in the camera's field of view. Such approach is more precise and is adapted for examining circuit boards in the field of precision molding technology or semiconductor electronic technology. Moreover, in some existing cases, a single laser dot may be substituted by a slit laser which is able to be swept across the object to speed up the measuring process.

In terms of a conventional laser measuring apparatus such as a laser measuring apparatus 100 in FIG. 1, it includes an image capturing unit 110 and a laser illumination unit 120. The image capturing unit 110 may be a camera with charge coupled devices (CCD), and the laser illumination unit 120 may be a linear light source. The angle between the central axis of an emitted laser beam and the viewing axis of the image capturing unit 110 is fixed. When an object A is disposed in front of the laser illumination unit 120 and the image capturing unit 110, a slit laser beam M may be projected onto the object A and captured by the image capturing unit 110.

However, since the distance between an object and a laser measuring apparatus may vary, the slit laser beam projected onto the object may result in different offsets. Hence, the performance of the laser measuring apparatus is dependent upon the accuracy of the calibration. Accordingly, to provide a method for calibrating the aforementioned laser measuring apparatus with simplicity and precision is one of the tasks to be solved.

SUMMARY OF THE INVENTION

Accordingly, the present invention is directed to a method and a system for calibrating a laser measuring apparatus, which not only maintain simplicity of use and low cost, but also provide a precise measurement in a follow-up measuring process.

The present invention is directed to a method for calibrating a laser measuring apparatus having a laser illumination unit and an image capturing unit. The method includes the following steps. First, a calibration board including at least one slit gap and a plurality of markers is provided. A relative position between the calibration board and the laser illumination unit is adjusted so as to allow a slit laser beam emitted by the laser illumination unit to pass through the at least one slit. Then, the calibration board is captured by the image capturing unit so as to generate a calibration board image. The calibration board image is processed so as to obtain a camera coordinate in a camera coordinate system of each of the markers in the calibration board image. Next, a plurality of calibration parameters are calculated according to the camera coordinate in the camera coordinate system of each of the markers and an actual coordinate in an actual coordinate system of each of the markers so as to obtain actual coordinates in the actual coordinate system of an object captured in an object image by the laser measuring apparatus.

According to an embodiment of the present invention, the step of processing the calibration board image so as to obtain the camera coordinate in the camera coordinate system of each of the markers in the calibration board image includes: performing an undistortion calculation on the calibration board image according a plurality of distortion parameters of the image capturing unit so as to generate an undistorted calibration board image and detecting the markers in the undistorted calibration board image so as to obtain the camera coordinate of each of the markers; or detecting each of the markers in the calibration board image and performing the undistortion calculation on each of the detected markers according to the distortion parameters of the image capturing unit so as to obtain the camera coordinate of each of the markers.

According to an embodiment of the present invention, the step of calculating the calibration parameters according to the camera coordinate in the camera coordinate system of each of the markers and the actual coordinate in the actual coordinate system of each of the markers so as to obtain the actual coordinates in the actual coordinate system of the object captured in the object image by the laser measuring apparatus includes: performing a regression analysis on the camera coordinate of each of the markers and the actual coordinate of each of the markers so as to generate the calibration parameters, wherein the calibration parameters form a regression matrix; performing the undistortion calculation on the object image according to the distortion parameters so as to generate an undistorted object image; and performing an affine transformation on a camera coordinate of a measuring point in the undistorted object image so as to obtain an actual coordinate of the measuring point.

According to an embodiment of the present invention, after the step of processing the calibration board image so as to obtain the camera coordinate in the camera coordinate system of each of the markers in the calibration board image, the method further includes the following steps. The calibration board image is divided into a plurality of calibration regions. The calibration region corresponding to each of the markers is obtained.

According to an embodiment of the present invention, the step of calculating the calibration parameters according to the camera coordinate in the camera coordinate system of each of the markers and the actual coordinate in the actual coordinate system of each of the markers so as to obtain the actual coordinates in the actual coordinate system of the object captured in the object image by the laser measuring apparatus includes: performing a regression analysis on the camera coordinates of the markers in each of the calibration regions and the actual coordinates of the markers in each of the calibration regions so as to generate the calibration parameters corresponding to each of the calibration regions, wherein the calibration parameters corresponding to each of the calibration regions respectively form a regression submatrix; performing the undistortion calculation on the object image according to the distortion parameters so as to generate an undistorted object image; obtaining a measuring regression submatrix according to a camera coordinate of a measuring point in the undistorted object image, wherein the measuring regression submatrix is the regression submatrix corresponding to the measuring point in the object image; and performing an affine transformation on the camera coordinate of the measuring point in the undistorted object image according to the measuring regression submatrix so as to obtain the actual coordinate of the measuring point.

The present invention is also directed to a system for calibrating a laser measuring apparatus having a laser illumination unit and an image capturing unit. The system includes a calibration board and an image processing device, where the image processing device is coupled to the laser measuring apparatus. The calibration board includes at least one slip gap and a plurality of markers, wherein a slit laser beam emitted by the laser illumination unit is allowed to pass through the at least one slit. When the image capturing unit captures the calibration board so as to generate a calibration board image, the image processing device processes the calibration board image so as to obtain a camera coordinate in a camera coordinate system of each of the markers in the calibration board image as well as calculates a plurality of calibration parameters according to the camera coordinate in the camera coordinate system of each of the markers and an actual coordinate in an actual coordinate system of each of the markers so as to obtain actual coordinates in the actual coordinate system of an object captured in an object image by the laser measuring apparatus.

According to an embodiment of the present invention, the image processing device performs an undistortion calculation on the calibration board image according a plurality of distortion parameters of the image capturing unit so as to generate an undistorted calibration board image as well as detects the markers in the undistorted calibration board image so as to obtain the camera coordinate of each of the markers. Alternatively, the image processing device detects each of the markers in the calibration board image as well as performs the undistortion calculation on each of the detected markers according to the distortion parameters of the image capturing unit so as to obtain the camera coordinate of each of the markers.

According to an embodiment of the present invention, the image processing device performs a regression analysis on the camera coordinate of each of the markers and the actual coordinate of each of the markers so as to generate the calibration parameters, wherein the calibration parameters form a regression matrix. The image processing device also performs the undistortion calculation on the object image according to the distortion parameters so as to generate an undistorted object image. The image processing device further performs an affine transformation on a camera coordinate of a measuring point in the undistorted object image so as to obtain an actual coordinate of the measuring point.

According to an embodiment of the present invention, the image processing device divides the calibration board image into a plurality of calibration regions and obtains the calibration region corresponding to each of the markers.

According to an embodiment of the present invention, the image processing device performs a regression analysis on the camera coordinates of the markers in each of the calibration regions and the actual coordinates of the markers in each of the calibration regions so as to generate the calibration parameters corresponding to each of the calibration regions, wherein the calibration parameters corresponding to each of the calibration regions respectively form a regression submatrix. The image processing device further performs the undistortion calculation on the object image according to the distortion parameters so as to generate an undistorted object image. The image processing device then obtains a measuring regression submatrix according to a camera coordinate of a measuring point in the undistorted object image, wherein the measuring regression submatrix is the regression sub-matrix corresponding to the measuring point in the object image. The image processing device also performs an affine transformation on the camera coordinate of the measuring point in the undistorted object image according to the measuring regression submatrix so as to obtain the actual coordinate of the measuring point.

To sum up, the method and the system for calibrating a laser measuring apparatus provided in the present invention may allow a laser light beam emitted by a laser illumination unit to pass through at least one slit gap on a calibration board by adjusting the orientation of the calibration board and may further capture markers on the calibration board by an image capturing device. Given actual coordinates of the markers, an affine transformation may be performed on camera coordinates and the actual coordinates of the markers so as to obtain a coordinate transformation of the laser light beam in the spatial domain and actual coordinates of an object may be thus calculated precisely. Such method and system for calibrating the laser measuring apparatus in the present invention not only maintain simplicity of use and low cost, but also provide a precise measurement in a follow-up measuring process.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1:
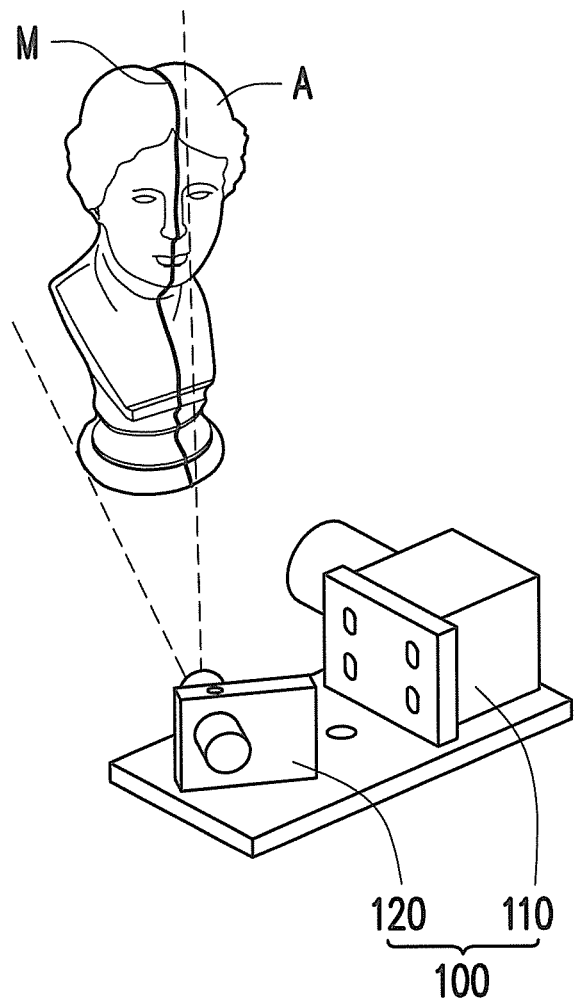
FIG. 1 illustrates a schematic diagram of a laser measuring apparatus according to an embodiment of the present invention.

Reference will now be made in detail to the present embodiments of the invention, examples of which are illustrated in the accompanying drawings. Wherever possible, the same reference numbers are used in the drawings and the description to refer to the same or like parts. In addition, the specifications and the like shown in the drawing figures are intended to be illustrative, and not restrictive. Therefore, specific structural and functional detail disclosed herein are not to be interpreted as limiting, but merely as a representative basis for teaching one skilled in the art to variously employ the present invention.

Figure 2:
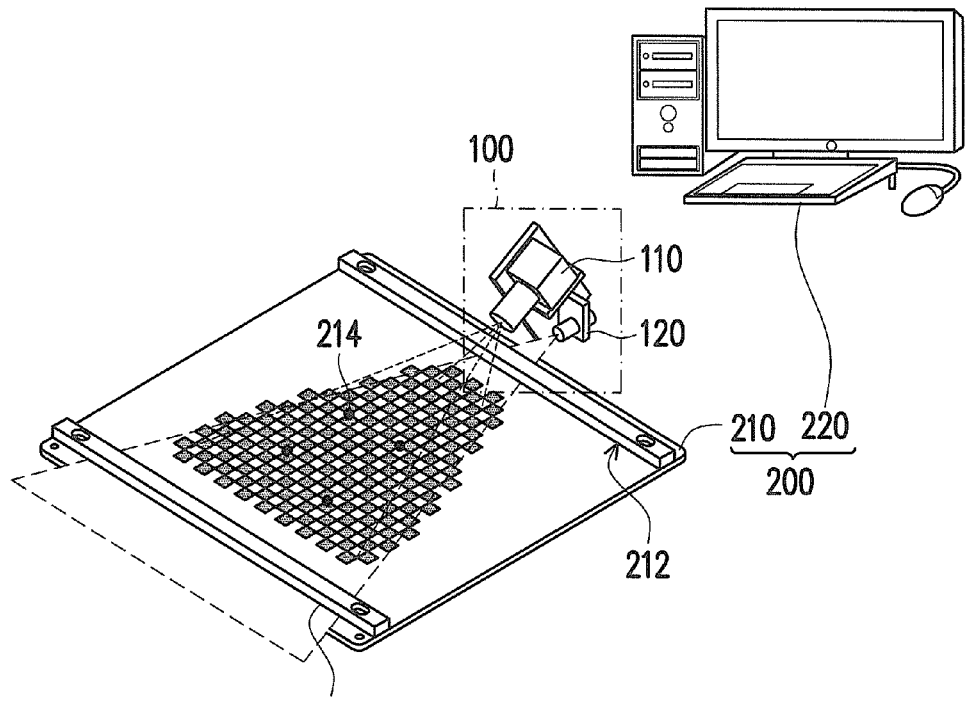
FIG. 2 illustrates a schematic diagram of a system for calibrating a laser measuring apparatus according to an embodiment of the present invention.

FIG. 2 illustrates a schematic diagram of a system for calibrating a laser measuring apparatus according to an embodiment of the present invention. It should, however, be noted that this is merely an illustrative example and the present invention is not limited in this regard. All components of the system and their configurations are first introduced in FIG. 2. The detailed functionalities of the components are disclosed along with FIG. 3.

Referring to FIG. 2, a system 200 for calibrating a laser measuring apparatus includes a calibration board 210 and an image processing device 220. In the present embodiment, the system 200 is adapted for, for example, calibrating the laser measuring apparatus 100 including the image capturing unit 110 and the laser illumination unit 120 as illustrated in FIG. 1, where the image processing device 220 is coupled to the laser measuring apparatus 100.

In the present embodiment, the calibration board 210 includes at least one slit gap 212 and a plurality of markers 214, where a slit laser beam emitted by the laser illumination unit 120 is allowed to pass through the at least one slit 212. In the present embodiment, a piece of thin paper with a printed calibration pattern is disposed on the calibration board 210. The thickness of the thin paper is approximate to the width of the slit laser beam. The calibration pattern may be any recognizable pattern such as a check pattern. After the calibration pattern is recognized, the markers 214 are able to be formed. In the present embodiment, the number of the markers may be at least four. Further details will be discussed hereafter.

The image processing device 220 may be a personal computer, a notebook computer, a smart phone, a tabular computer, and yet the present invention is not limited thereto. The image processing device 220 includes a memory and a processor. The memory is adapted to store images captured by the image capturing device 110, while the processor is configured to process the images stored in the memory. Furthermore, the image processing device 220 may obtain the images captured by the image capturing device 110 via wired transmission or wireless transmission.

Figure 3:
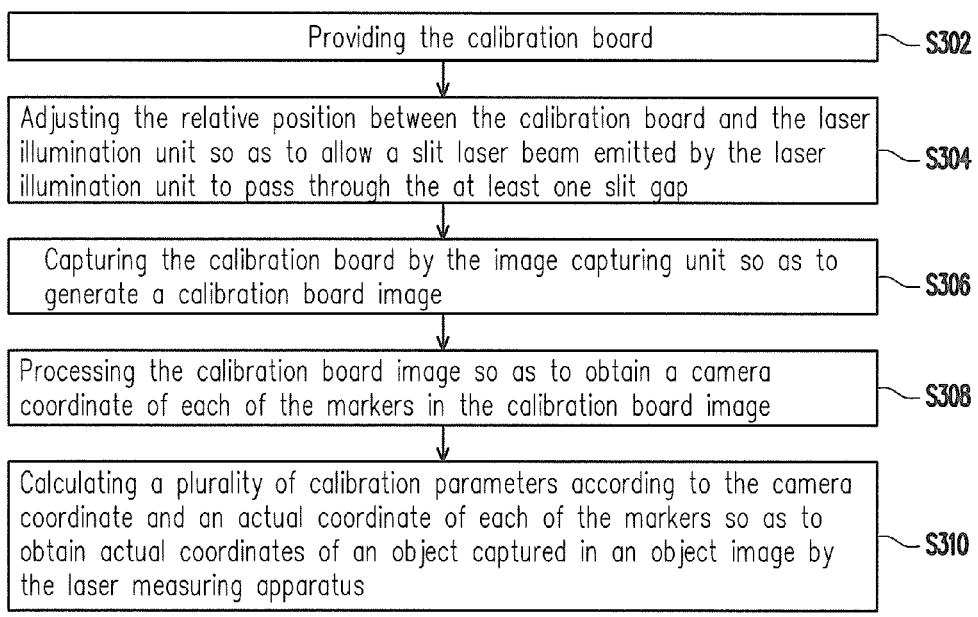
FIG. 3 is a method for calibrating a laser measuring apparatus according to an embodiment of the present invention.

FIG. 3 is a method for calibrating a laser measuring apparatus according to an embodiment of the present invention. The method illustrated in FIG. 3 may be implemented by the system 200 illustrated in FIG. 2.

Referring to both FIG. 2 and FIG. 3, first, the calibration board 210 is provided (Step S302), and the relative position between the calibration board 210 and the laser illumination unit 100 is adjusted so as to allow a slit laser beam emitted by the laser illumination unit 120 to pass through the at least one slit gap 212 (Step S304). In the present embodiment, to ensure that the plane formed by the projection of the slit laser beam emitted by the laser illumination unit 120 on the spatial domain is extremely close to the surface of the calibration board 210, the number of the at least one slit gap 212 may be two. Furthermore, a universal joint or other tilt adjustment assemblies may be used for adjusting the tilt angle of the calibration board 210 as well as supporting the calibration board 210.

Next, the calibration board 210 is captured by the image capturing unit 110 so as to generate a calibration board image (Step S306). In other words, when the relative position between the calibration board 210 and the laser illumination unit 110 is decided, the image capturing unit 110 may capture the calibration board 210, and the content of the image is the aforementioned calibration pattern.

Then, the image processing device 220 may process the calibration board image so as to obtain a camera coordinate in a camera coordinate system of each of the markers in the calibration board image (Step S308). To be specific, the image processing device 220 may first perform an undistortion calculation on the calibration board image according to a plurality of distortion parameters so as to generate an undistorted calibration board image. The distortion parameters in the present embodiment may be an intrinsic parameter K and a lens distortion parameter k. The intrinsic parameter K may be written as a 3×3 matrix, which is used to describe the transformation between camera coordinates and image coordinates. The lens distortion parameter k may be represented by polynomials, which is used to describe barrel distortion or pincushion distortion caused by the lens. In other words, after the image processing device 220 performs the undistortion calculation on the calibration board image by using the distortion parameters, the undistorted calibration board image generated thereafter may be a corrected image approximate to a pinhole camera model. The image processing device 220 may detect the markers 214 in the undistorted calibration board image by leveraging an existing image pattern recognition technique and calculate the corresponding coordinates so as to obtain the camera coordinate of each of the markers 214 in the camera coordinate system. However, the present invention is not limited herein. In another embodiment, the image processing device 220 may first detect each of the markers 214 in the calibration board image and perform the undistortion calculation on each of the markers 214 so as to obtain the camera coordinate of each of the markers 214 for computational efficiency.

Next, the image processing device 220 calculates a plurality of calibration parameters according to the camera coordinate of each of the markers 214 and an actual coordinate of each of the markers 214 so as to obtain actual coordinates of an object captured in an object image by the laser measuring apparatus 100 (Step S310). Since the coordinate of each of the markers 214 on the paper (the calibration board) is known, (i.e. the actual coordinate of each of the markers 214 in the actual coordinate system is known), the image processing device 220 may perform a regression analysis on the camera coordinate of each of the markers 214 and the actual coordinate of each of the markers 214 so as to generate the aforementioned calibration parameters, where the calibration parameters may form a regression matrix.

To be specific, assume that the actual coordinate and the camera coordinate of an arbitrary marker are x'$_i$ and x$_i$ respectively. Ideally, x'$_i$ and x$_i$ may satisfy Eq. (1):

$$x'_i = Hx_i \quad \text{Eq. (1)}$$

where H is an affine matrix, which is so-called a homogeneous matrix and used to describe the transformation between coordinates of a plane captured by the image capturing unit 110 after the undistortion calculation (i.e. camera coordinates) and the coordinates formed by the slit laser beam (i.e. actual coordinates). To solve H, assume that the cross product of the markers in the actual coordinate system mapped from the camera coordinate system and the markers in the actual coordinate system is a zero vector and may be written as Eq. (2):

$$x'_i \times Hx_i = 0 \quad \text{Eq. (2)}$$

Also, the homogeneous coordinate of x'$_i$ may be written as Eq. (3):

$$x'_i = [x'_i, y'_i, w'_i]^T \quad \text{Eq. (3)}$$

Next, if the row vectors of H are represented as h$^{1T}$, h$^{2T}$, and h$^{3T}$, then H and h* may be written as a 3×3 matrix in Eq. (4) and a 1×9 matrix in Eq. (5):

$$H = \begin{pmatrix} h^{1T} \\ h^{2T} \\ h^{3T} \end{pmatrix} \quad \text{Eq. (4)}$$

$$h^* = \begin{pmatrix} h^1 \\ h^2 \\ h^3 \end{pmatrix} \quad \text{Eq. (5)}$$

If Eq. (5) is substitute into Eq. (2), Eq. (2) may be rewritten as Eq. (6):

$$\begin{bmatrix} 0^T & -w'_i x_i^T & y'_i x_i^T \\ w'_i x_i^T & 0^T & -x'_i x_i^T \\ -y'_i x_i^T & x'_i x_i^T & 0^T \end{bmatrix} \begin{pmatrix} h^1 \\ h^2 \\ h^3 \end{pmatrix} = 0 \quad \text{Eq. (6)}$$

Then H may be solved by singular value decomposition (SVD). It should be noted that, at least four steady points may be required for calculating H. Thus, the number of the aforementioned markers 214 should be at least four in the present embodiment.

In an ideal situation, the matrix H calculated by the image processing device 220 is a 3×3 regression matrix, where the elements in the regression matrix are the aforementioned calibration parameters. Accordingly, the actual coordinate x' of an arbitrary marker on the calibration board may be calculated by multiplying the camera coordinate x of an arbitrary marker by H.

Figure 4:
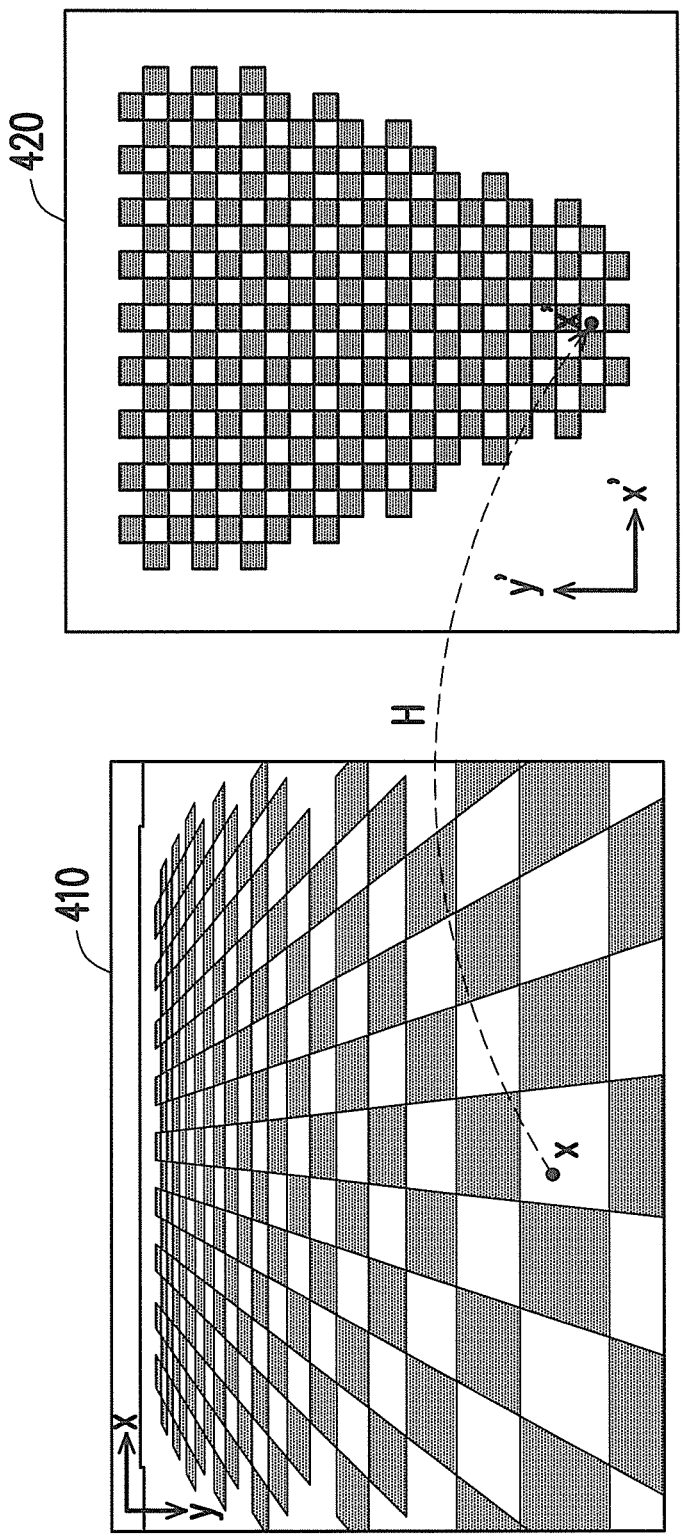
FIG. 4 illustrates a schematic diagram of the calibration parameters used for coordinate transformation according to an embodiment of the present invention.

For example, FIG. 4 illustrates a schematic diagram of the calibration parameters used for coordinate transformation according to an embodiment of the present invention. Referring to FIG. 4, a camera coordinate system 410 includes a marker with the coordinate x. After the affine transformation is performed on the coordinate x by the regression matrix H, when a precise printout is printed in high resolution, a marker with the coordinate x' in an actual coordinate system 420 may be printed out.

In an embodiment, the image processing device 220 may store the regression matrix formed by the distortion parameters of the image capturing unit 110 and the calibration parameters so that the laser measuring apparatus 100 may be provided to obtain actual coordinates of an object in a follow-up process.

Figure 5:
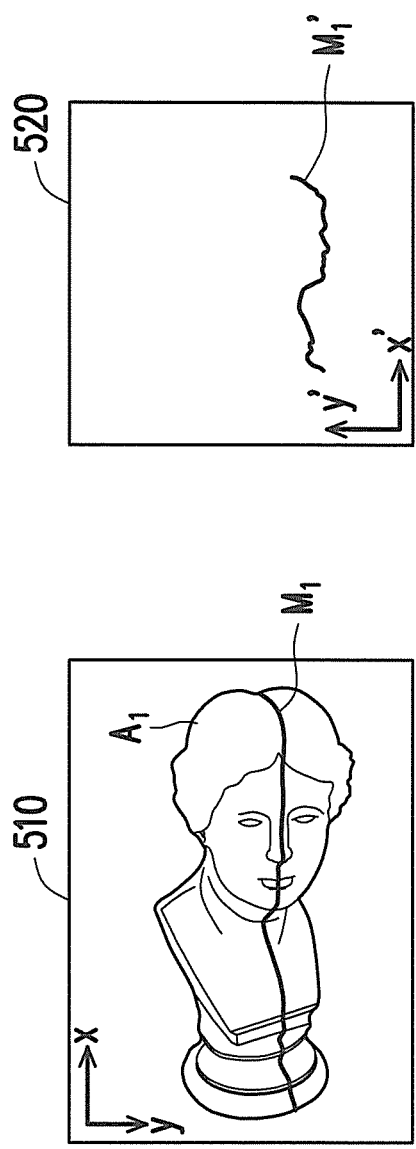
FIG. 5 illustrates an application of the distortion parameters and the calibration parameters according to an embodiment of the present invention.

FIG. 5 illustrates an application of the distortion parameters and the calibration parameters according to an embodiment of the present invention.

Referring to FIG. 5, in the present embodiment, an object is disposed in front of the laser illumination unit 110 and emitted by a slit laser beam such that a relatively brighter slit is formed on the surface of the object. Next, the image capturing device 110 may capture the object so as to generate an object image. The image processing device 220 may perform the undistortion calculation on the object image according to the aforementioned distortion parameters so as to generate an undistorted object image 510 and calculate a relatively brighter slit M$_1$ on the surface of the object A$_1$ in the undistorted object image 510 via an image processing technique.

For example, the image processing device 220 may calculate the relatively brighter slit among all pixels in the undistorted object image 510 and approximate the positions of the sub-pixels of bright points with reference to a local Gaussian distribution, where each of the bright points may be viewed as a measuring point. Next, the image processing device 220 may multiply the camera coordinates of the measuring points by the regression matrix formed by the calibration parameters so as to calculate two-dimensional coordinates of the surface of the object A$_1$ with respect to the coordinate system formed by the slit laser beam (i.e. the actual coordinate system). In teens of the undistorted object image 510 and the slit M$_1$ illustrated herein, since the distance between the object A$_1$ and the laser illumination unit 110 may vary so that an affine slit M'$_1$ observed in an image 520 in the actual coordinate system may change at least in the y-direction. If the image 520 in the actual coordinate system is rotated by 90 degrees, a similar result may be obtained. Namely, the affine slit observed in the rotated image may change at least in the x-direction due to different object distances. However, the present invention is not limited herein. In another embodiment, the image processing device 220 may first calculate the relatively bright slit among all of the pixels in the object image so as to find out the measuring points and then perform the undistortion calculation on the measuring points for computational efficiency.

It should be noted that, when the image capturing unit 110 captures the calibration board 210, the markers relatively further away from the image capturing unit 110 may be presented in lower resolution in the calibration board image. Hence, in another embodiment, the image processing device 220 may divide the calibration board into a plurality of calibration regions in Step S310, where each of the calibration regions includes at least four markers. The size of each of the calibration regions may be set according to an actual requirement, and thus the present invention is not limited herein.

Similarly, for each of the calibration regions, the image processing device 220 may perform the regression analysis on the camera coordinates and the actual coordinates of the markers in each of the calibration regions so as to generate the calibration parameters corresponding to each of the calibration regions, where the calibration parameters corresponding to each of the calibration regions may form a regression submatrix respectively. Ideally, each of the regression submatrices calculated by the image processing device 220 may be a 3×3 regression matrix as well.

In one embodiment, the image processing device 220 may first perform the undistortion calculation according to the distortion parameters so as to generate an undistorted object image and obtain the regression submatrix corresponding to each of the calibration regions (referred to as a "measuring regression submatrix") according to a camera coordinate of a measuring point in the object image. Next, the image processing device 220 may multiply the camera coordinate of the measuring point by the measuring regression submatrix so as to obtain the actual coordinate of the measuring point.

Figure 6:
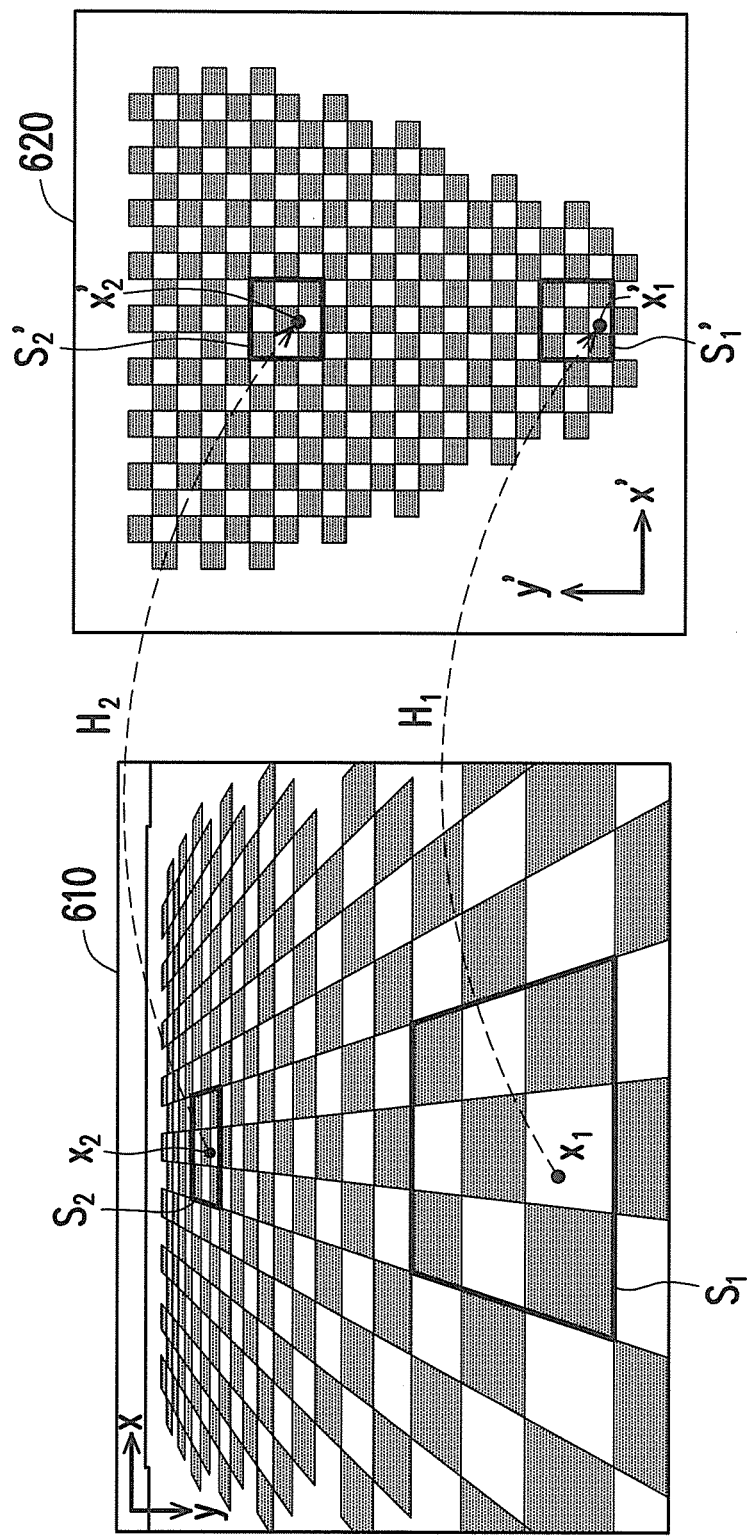
FIG. 6 illustrates a schematic diagram of the calibration parameters used for coordinate transformation according to another embodiment of the present invention.

For example, FIG. 6 illustrates a schematic diagram of the calibration parameters used for coordinate transformation. Referring to FIG. 6, a camera coordinate system 610 includes two markers with a coordinate $x_1$ and a coordinate $x_2$, where the coordinate $x_1$ and the coordinate $x_2$ are located within a calibration region $S_1$ and a calibration region $S_2$ respectively. Next, after the affine transformation is performed on the coordinate $x_1$ and the coordinate $x_2$ by a regression submatrix $H_1$ and a regression submatrix $H_2$, when a precise printout is printed in high resolution, a marker with the coordinate $x'_1$ located within a calibration region $S_1$ and a marker with the coordinate $x'_2$ located within the calibration region $S_2$ in an actual coordinate system 620 may be printed out.

Furthermore, there exists a relative motion between the laser measuring apparatus 100 and the object. A range scan or a scan with a higher coverage may be achieved by generating three-dimensional measuring data in another axial direction through the relative motion. In an embodiment, the movement of the laser measuring apparatus 100 may be rotation, translation or in any path, and the three-dimensional contour of a static model may be constructed. In another embodiment, the laser measuring apparatus 100 may be fixed, and the object may be rotated or translated so that the laser measuring apparatus 100 may capture three-dimensional data points from various viewing directions and generate a plurality of triangular meshes so as to generate a complete three-dimensional digital model of the object.

To sum up, the method and the system for calibrating a laser measuring apparatus provided in the present invention may allow a laser light beam emitted by a laser illumination unit to pass through at least one slit gap on a calibration board by adjusting the orientation of the calibration board and may further capture markers on the calibration board by an image capturing device. Given actual coordinates of the markers, an affine transformation may be performed on camera coordinates and the actual coordinates of the markers so as to obtain a coordinate transformation of the laser light beam in the spatial domain and actual coordinates of an object may be thus calculated precisely. Such method and system for calibrating the laser measuring apparatus in the present invention not only maintain simplicity of use and low cost, but also provide a precise measurement in a follow-up measuring process.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A method for calibrating a laser measuring apparatus having a laser illumination unit and an image capturing unit comprising:

providing a single calibration board, wherein the calibration board comprises at least one slit gap and a plurality of markers;

adjusting a relative position between the calibration board and the laser illumination unit so as to allow a slit laser beam emitted by the laser illumination unit to pass through each of the at least one slit gap simultaneously, wherein the slit laser beam and each of the at least one slit gap are coplanar;

capturing the calibration board by the image capturing unit so as to generate a calibration board image;

processing the calibration board image so as to obtain a camera coordinate in a camera coordinate system of each of the markers in the calibration board image; and calculating a plurality of calibration parameters according to the camera coordinate in the camera coordinate system of each of the markers and an actual coordinate in an actual coordinate system of each of the markers so as to obtain actual coordinates in the actual coordinate system of an object captured in an object image by the laser measuring apparatus.

2. The method according to claim 1, wherein the step of processing the calibration board image so as to obtain the camera coordinate in the camera coordinate system of each of the markers in the calibration board image comprises:

performing an undistortion calculation on the calibration board image according a plurality of distortion parameters of the image capturing unit so as to generate an undistorted calibration board image and detecting the markers in the undistorted calibration board image so as to obtain the camera coordinate of each of the markers; or detecting each of the markers in the calibration board image and performing the undistortion calculation on each of the detected markers according to the distortion parameters of the image capturing unit so as to obtain the camera coordinate of each of the markers.

3. The method according to claim 2, wherein the step of calculating the calibration parameters according to the camera coordinate in the camera coordinate system of each of the markers and the actual coordinate in the actual coordinate system of each of the markers so as to obtain the actual coordinates in the actual coordinate system of the object captured in the object image by the laser measuring apparatus comprises:

performing a regression analysis on the camera coordinate of each of the markers and the actual coordinate of each of the markers so as to generate the calibration parameters, wherein the calibration parameters form a regression matrix;

performing the undistortion calculation on the object image according to the distortion parameters so as to generate an undistorted object image; and performing an affine transformation on a camera coordinate of a measuring point in the undistorted object image so as to obtain an actual coordinate of the measuring point.

4. The method according to claim 1, wherein after the step of processing the calibration board image so as to obtain the camera coordinate in the camera coordinate system of each of the markers in the calibration board image, the method further comprises:

dividing the calibration board image into a plurality of calibration regions; and obtaining the calibration region corresponding to each of the markers.

5. The method according to claim 4, wherein the step of calculating the calibration parameters according to the camera coordinate in the camera coordinate system of each of the markers and the actual coordinate in the actual coordinate system of each of the markers so as to obtain the actual coordinates in the actual coordinate system of the object captured in the object image by the laser measuring apparatus comprises:

performing a regression analysis on the camera coordinates of the markers in each of the calibration regions and the actual coordinates of the markers in each of the calibration regions so as to generate the calibration parameters corresponding to each of the calibration regions, wherein the calibration parameters corresponding to each of the calibration regions respectively form a regression submatrix;

performing the undistortion calculation on the object image according to the distortion parameters so as to generate an undistorted object image;

obtaining a measuring regression submatrix according to a camera coordinate of a measuring point in the undistorted object image, wherein the measuring regression submatrix is the regression submatrix corresponding to the measuring point in the object image; and performing an affine transformation on the camera coordinate of the measuring point in the undistorted object image according to the measuring regression submatrix so as to obtain the actual coordinate of the measuring point.

6. A system for calibrating a laser measuring apparatus having a laser illumination unit and an image capturing unit comprising:

a single calibration board, comprising at least one slit gap and a plurality of markers, wherein a slit laser beam emitted by the laser illumination unit is allowed to pass through each of the at least one slit gap simultaneously, wherein the slit laser beam and each of the at least one slit gap are coplanar; and an image processing device, coupled to the laser measuring apparatus, wherein when the image capturing unit captures the calibration board so as to generate a calibration board image, the image processing device processes the calibration board image so as to obtain a camera coordinate in a camera coordinate system of each of the markers in the calibration board image as well as calculates a plurality of calibration parameters according to the camera coordinate in the camera coordinate system of each of the markers and an actual coordinate in an actual coordinate system of each of the markers so as to obtain actual coordinates in the actual coordinate system of an object captured in an object image by the laser measuring apparatus.

7. The system according to claim 6, wherein the image processing device performs an undistortion calculation on the calibration board image according a plurality of distortion parameters of the image capturing unit so as to generate an undistorted calibration board image as well as detects the markers in the undistorted calibration board image so as to obtain the camera coordinate of each of the markers, or wherein the image processing device detects each of the markers in the calibration board image as well as performs the undistortion calculation on each of the detected markers according to the distortion parameters of the image capturing unit so as to obtain the camera coordinate of each of the markers.

8. The system according to claim 7, wherein the image processing device performs a regression analysis on the camera coordinate of each of the markers and the actual coordinate of each of the markers so as to generate the calibration parameters, wherein the calibration parameters form a regression matrix, the image processing device further performs the undistortion calculation on the object image according to the distortion parameters so as to generate an undistorted object image, and the image processing device performs an affine transformation on a camera coordinate of a measuring point in the undistorted object image so as to obtain an actual coordinate of the measuring point.

9. The system according to claim 6, wherein the image processing device divides the calibration board image into a plurality of calibration regions and obtains the calibration region corresponding to each of the markers.

10. The system according to claim 9, wherein the image processing device performs a regression analysis on the camera coordinates of the markers in each of the calibration regions and the actual coordinates of the markers in each of the calibration regions so as to generate the calibration parameters corresponding to each of the calibration regions, wherein the calibration parameters corresponding to each of the calibration regions respectively form a regression submatrix, the image processing device further performs the undistortion calculation on the object image according to the distortion parameters so as to generate an undistorted object image, the image processing device obtains a measuring regression submatrix according to a camera coordinate of a measuring point in the undistorted object image, wherein the measuring regression submatrix is the regression sub-matrix corresponding to the measuring point in the object image, and the image processing device performs an affine transformation on the camera coordinate of the measuring point in the undistorted object image according to the measuring regression submatrix so as to obtain the actual coordinate of the measuring point.

* * * * *